(12) United States Patent
Pickens

(10) Patent No.: US 7,431,863 B2
(45) Date of Patent: Oct. 7, 2008

(54) CALCIUM HYPOCHLORITE COMPOSITION

(75) Inventor: Stanley R. Pickens, Monroeville, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 412 days.

(21) Appl. No.: 11/370,338

(22) Filed: Mar. 8, 2006

(65) Prior Publication Data

US 2007/0210280 A1    Sep. 13, 2007

(51) Int. Cl.
*A62D 3/00* (2007.01)
*C01B 11/06* (2006.01)
*C11D 7/15* (2006.01)
*C11D 7/18* (2006.01)
*A61K 9/20* (2006.01)

(52) U.S. Cl. .............. 252/187.3; 252/187.27; 252/187.28; 252/186.25; 252/186.37; 423/474; 424/464; 510/302

(58) Field of Classification Search ............... 252/187.3
See application file for complete search history.

(56) References Cited

U.S. PATENT DOCUMENTS

| | | | |
|---|---|---|---|
| 3,297,413 A * | 1/1967 | Bennett ..................... 23/301 |
| 3,793,216 A * | 2/1974 | Dychdala et al. ....... 252/186.37 |
| 3,969,546 A * | 7/1976 | Saeman ..................... 427/213 |
| 4,048,351 A | 9/1977 | Saeman et al. |
| 4,071,605 A | 1/1978 | Wojtowicz |
| 4,108,792 A | 8/1978 | Farmer, Jr. et al. |
| 4,118,524 A * | 10/1978 | Saeman ..................... 427/213 |
| 4,146,676 A * | 3/1979 | Saeman et al. ............. 428/403 |
| 4,174,411 A * | 11/1979 | Saeman et al. ............. 427/214 |
| 4,201,756 A * | 5/1980 | Saeman et al. ............. 423/266 |
| 6,638,446 B1 * | 10/2003 | Mullins ................. 252/187.28 |
| 6,969,527 B2 * | 11/2005 | Brennan et al. ............. 424/464 |
| 2004/0197395 A1 * | 10/2004 | Brennan et al. ............. 424/464 |
| 2004/0214738 A1 * | 10/2004 | Brennan et al. ............. 510/298 |
| 2005/0279971 A1 * | 12/2005 | Garris ....................... 252/601 |
| 2006/0081810 A1 * | 4/2006 | Blanchette et al. .......... 252/175 |
| 2006/0093669 A1 * | 5/2006 | Brennan et al. ............. 424/464 |
| 2006/0110453 A1 * | 5/2006 | Brennan et al. ............. 424/464 |
| 2006/0178584 A1 * | 8/2006 | Karo et al. ................. 600/499 |
| 2007/0224108 A1 * | 9/2007 | Garris ....................... 423/474 |

FOREIGN PATENT DOCUMENTS

GB          1 579 793         11/1977

* cited by examiner

*Primary Examiner*—Joseph D Anthony
(74) *Attorney, Agent, or Firm*—Linda Pingitore; Irwin M. Stein

(57) ABSTRACT

Describes a composition comprising a mixture of calcium hypochlorite and hydrated magnesium sulfate having an average of from 3 to 5.5 moles of water of hydration per mole of magnesium sulfate. The amount of hydrated magnesium sulfate in the composition is such that the composition has at least a DOT Packing Group III Division 5.1 Classification.

16 Claims, 1 Drawing Sheet

CALCIUM HYPOCHLORITE COMPOSITION

FIELD OF THE INVENTION

This invention relates to solid calcium hypochlorite compositions. In particular, this invention relates to calcium hypochlorite compositions having a lower oxidizer classification than calcium hypochlorite alone. Still more particularly, the present invention relates to compositions comprising a mixture of particulate calcium hypochlorite and partially hydrated magnesium sulfate that has an average of from 3 to 5.5 moles of water of hydration per mole of mole of magnesium sulfate. This invention further relates to methods for preparing such partially hydrated magnesium sulfate.

BACKGROUND OF THE INVENTION

Recreational and commercial water systems, as well as natural bodies of water, e.g., ponds, are subject to contamination from the presence and growth of microbes, e.g., algae, pathogenic bacteria and fungi. The sanitization of standing or recirculating water systems often involves introducing a hypochlorite anion donor material, such as calcium hypochlorite, into the water system so as to establish a desired level, e.g., a sanitizing amount, of free available chlorine (FAC) within the water system. The presence of free available chlorine serves to eradicate or control deleterious amounts of microbial species that are present in the water comprising the water system. Sanitation of water contacted by humans and animals is required because exposure to unsanitized or inadequately sanitized water that contains deleterious amounts of pathogenic bacteria, fungi, viruses, protozoa, etc can lead to the development of infection or disease.

Recreational bodies of water, e.g., swimming pools, hot tubs, spas, etc are generally treated with chlorine-containing sanitizers so as to contain free available chlorine (FAC) in amounts of from 1 to 3 parts FAC per million parts of water [ppm, (sometimes reported as milligrams per Liter, mg/L)]. Water having an FAC content in amounts of greater than 10 ppm (generally in the range of hundreds to thousands of mg/L) can be used to sanitize surfaces or articles to which it is applied, e.g., surfaces of equipment or tables used for the preparation of food. Free available chlorine (FAC) can be established in an aqueous system by adding regularly a source of hypochlorous acid (HOCl) or hypochlorite anion (ClO$^-$), e.g., calcium hypochlorite, to the water comprising the aqueous system.

Hypochlorous acid or hypochlorite anion can be introduced into water to be sanitized by passing the water, or a portion thereof, through a container that contains calcium hypochlorite, e.g., calcium hypochlorite in the form of granules, tablets or other shaped forms. Alternatively, calcium hypochlorite, e.g., granular calcium hypochlorite, can be added directly to water that is to be treated, e.g., sanitized. When water is introduced into the container containing the calcium hypochlorite, it dissolves, thereby forming an aqueous solution comprising hypochlorite anion, which solution is mixed with the water to be treated.

In the case of a standing or recirculating body of water, e.g., a swimming pool, periodic batch additions of higher levels of hypochlorite anion can be made to the body of water in addition to the relatively steady and lower level additions described previously. Such batch additions of higher levels of hypochlorite anion are commonly referred to as a "shock treatment" or as "superchlorination" and are made on a periodic basis, e.g., once a week, once a month, or as required by problems or conditions arising in the pool or spa, such as high bather loads, algae blooms, high rainfall, fecal release accidents, etc. The purpose of a shock treatment is to briefly increase the FAC of the water to, e.g., 5 to 20 mg/L, to consume accumulated organic material, destroy chloramines and/or control algae blooms or pathogen infestations. A shock treatment is administered by, for example, preparing a concentrated aqueous solution of calcium hypochlorite and adding this concentrated solution to the water, or distributing, e.g., broadcasting, an appropriate amount of particulate calcium hypochlorite directly over the surface of the water.

Calcium hypochlorite is an oxidizer that can cause or enhance the combustion of organic materials by providing oxygen for combustion. In accordance with US Department of Transportation (DOT) regulations; namely, Title 49, Code of Federal Regulations (CFR), part 173, section 127, paragraph (a), subparagraph (1), [49 CFR §173.127(a)(1)], calcium hypochlorite is categorized as a Division 5.1 oxidizer. More particularly, it is classified as a Packing Group II oxidizer material [49 CFR §173.127(b)(ii)]. The transport of a material categorized as a Division 5.1 oxidizer requires the use of special precautions, which can include the use of special containers.

Further, the National Fire Protection Association (NFPA) classifies calcium hypochlorite having greater than 50% free available chlorine as a Class 3 oxidizer. NFPA Class 3 oxidizers can require separate free standing storage facilities and/or special sprinkler systems. Depending on the volume of water that is to be sanitized, the amount of calcium hypochlorite that is stored on site can be large. Hence, the requirements for storing and handling large amounts of conventional calcium hypochlorite can involve substantial costs.

It is, therefore, desirable to develop a solid calcium hypochlorite composition that is not classified as a DOT Packing Group II Division 5.1 oxidizer (or a Class 3 NFPA oxidizer), but rather can be classified as a DOT Packing Group III Division 5.1 oxidizer (or a Class 2 NFPA oxidizer), more desirably as a DOT non-Division 5.1 oxidizer (or a Class 1 NFPA oxidizer). It is also desirable that such a solid calcium hypochlorite composition have a FAC content at least sufficient to allow its practical use in the batch and/or continuous sanitization of water systems, e.g., standing or recirculating water systems such as a swimming pool, spa, hot tub, cooling tower water, evaporative condenser, etc.

DESCRIPTION OF THE INVENTION

In accordance with a non-limiting embodiment of the present invention, there is provided a composition comprising a mixture of (a) calcium hypochlorite, e.g., hydrated calcium hypochlorite, and (b) hydrated magnesium sulfate having an average of from 3 to 5.5, e.g., 3 to 5, such as 3 to 4, moles of water per mole of magnesium sulfate. The amount of hydrated magnesium sulfate in the composition is such that the calcium hypochlorite composition has at least a DOT Packing Group III Division 5.1 classification. Alternatively, the amount of hydrated magnesium sulfate present in the calcium hypochlorite composition is such that the composition is classified as a non-Division 5.1 oxidizer.

In another non-limiting embodiment of the present invention, there is provided a method for preparing magnesium sulfate n-H$_2$O, wherein n is a number of from 1 to 5, which method comprises mixing n moles of particulate magnesium sulfate heptahydrate with 7−n moles of anhydrous magnesium sulfate, and allowing the water of hydration in the mixture to equilibrate between the magnesium sulfate heptahydrate and the anhydrous magnesium sulfate, thereby to produce hydrated magnesium sulfate hydrate having an average of n moles of water.

In a further non-limiting embodiment of the present invention, there are provided calcium hypochlorite compositions that are classified as at least a DOT Packing Group III Division 5.1 oxidizer, which compositions comprise a mixture of (a) calcium hypochlorite and (b) hydrated magnesium sulfate having from 3 to 5 moles of water per mole of magnesium sulfate that has been prepared by heating a blend of anhydrous magnesium sulfate and hydrated magnesium sulfate for a time sufficient to expend the exotherm resulting from the blend.

DETAILED DESCRIPTION OF THE INVENTION

Figure 1:
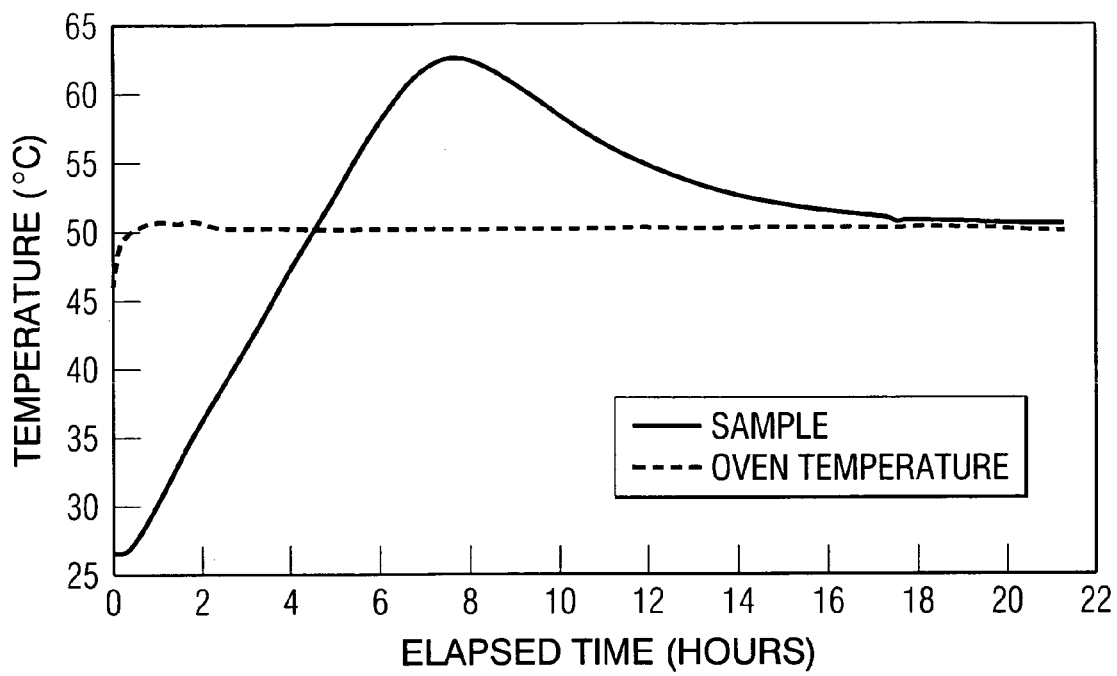
FIG. 1 is a plot of the core temperature versus time of a 2:1 blend (by weight) of magnesium sulfate heptahydrate:anhydrous magnesium sulfate in an oven that is heated to 50° C.

For purposes of this specification (other than in the operating examples), unless otherwise indicated, all numbers expressing quantities and ranges of materials, process conditions, hydrate levels, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements, including that found in the measuring instrument. Also, it is to be understood that any numerical range recited in this specification is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used in the following description and claims, the following terms have the indicated meanings:

The term "at least a DOT Packing Group III Division 5.1 classification" means that the indicated material has a DOT Packing Group III Division 5.1 classification or is not a Division 5.1 oxidizer.

The term "at least a Class 2 NFPA classification" means that the indicated material has a NFPA Class 2 or NFPA Class 1 classification.

The term "hydrated calcium hypochlorite" means calcium hypochlorite having from 5.5 to 16 weight percent water, e.g., as bound water or as water of hydration. See, calcium hypochlorite, hydrated (UN # 2880) in 49 CFR 172.101, Appendix A.

The term "dry calcium hypochlorite" means calcium hypochlorite having less than 5.5 weight percent water, e.g., as bound water or as water of hydration. See, calcium hypochlorite, dry (UN # 1748) in 49 CFR 172.101, Appendix A.

The term "calcium hypochlorite" means calcium hypochlorite having an unspecified amount of bound water or water of hydration, and includes hydrated calcium hypochlorite and dry calcium hypochlorite.

The term "magnesium sulfate hydrate", "hydrated magnesium sulfate" or terms of like import means magnesium sulfate containing water combined in the molecular form, as, for example, magnesium sulfate heptahydrate, which has 7 moles of combined water per mole of magnesium sulfate.

The term "mixture", "admixture", "blend" or terms of like import, as used for example in connection with the described mixture of calcium hypochlorite and hydrated magnesium sulfate, (or the blend of anhydrous magnesium sulfate and magnesium sulfate hydrate) means that the mixture, admixture or blend comprises a physical intermingling of distinct particles of calcium hypochlorite and hydrated magnesium sulfate, as distinguished from particles comprising a core of calcium hypochlorite that is coated or encapsulated with other inorganic salts, (or of distinct particles of anhydrous magnesium sulfate and hydrated magnesium sulfate). The term "mixture" includes formed articles, e.g., tablets or other shaped forms, prepared from the mixture of hydrated calcium hypochlorite and hydrated magnesium sulfate.

In a non-limiting embodiment of the present invention, there are contemplated compositions comprising an admixture of solid calcium hypochlorite, e.g., hydrated calcium hypochlorite, such as particulate or granular calcium hypochlorite, and particulate hydrated magnesium sulfate having an average of from 3 to 5.5 moles of water of hydration per mole of magnesium sulfate. In another non-limiting embodiment of the present invention, there are contemplated solid shaped articles, e.g., tablets, prepared from the aforedescribed compositions.

In one non-limiting embodiment, the mixture of calcium hypochlorite and hydrated magnesium sulfate may be prepared by dry blending these two components in any appropriate dry blending vessel by methods known to those skilled in the art. The resulting mixture generally will be substantially uniform in the distribution of the two components within the mixture, but may not be completely homogeneous since there may be some disparity in the distribution of the magnesium sulfate hydrate and the solid calcium hypochlorite within the mixture due to the blending process.

In a non-limiting embodiment of the present invention, the proportions of calcium hypochlorite and hydrated magnesium sulfate are chosen so that the resulting composition is not categorized as a US Department of Transportation (DOT) Packing Group I or Packing Group II Division 5.1 oxidizer material (or as a NFPA class 4 or class 3 oxidizer material), but rather are categorized at least as a DOT Packing Group III Division 5.1 oxidizer (or as a NFPA class 2 oxidizer material). More desirably, the proportions of calcium hypochlorite and hydrated magnesium sulfate are chosen so that the resulting compositions are categorized as a non-Division 5.1 oxidizer (or as a NFPA class 1 oxidizer material).

In accordance with regulations of the US Department of Transportation, 49 CFR §173.127(a), an "oxidizer" (Division 5.1) is defined as a material that may, generally by yielding oxygen, cause or enhance the combustion of other materials. A solid material is classified as a Division 5.1 material if, when tested in accordance with the UN Manual of Tests and Criteria, the solid material has a mean burning time that is less than or equal to the burning time of a 3:7 potassium bromate-cellulose mixture [49 CFR §173.127(a)(1)].

Solid Division 5.1 materials are assigned packing groups using the following criteria [49 CFR §173.127(b)]:

(i) Packing Group I is the sub-classification of any material which, in the 4:1 or 1:1 sample to cellulose ratio (by mass) tested exhibits a mean burning time less than the mean burning time of a 3:2 mixture, by mass, of potassium bromate and cellulose.

(ii) Packing Group II is the sub-classification of any material which, in the 4:1 or 1:1 sample to cellulose ratio (by mass) tested exhibits a mean burning time less than the mean burning time of a 2:3 mixture, by mass, of potassium bromate and cellulose, and the criteria for Packing Group I are not met.

(iii) Packing Group III is the sub-classification of any material which, in the 4:1 or 1:1 sample to cellulose ratio (by mass) tested exhibits a mean burning time less than the mean burning time of a 3:7 mixture, by mass, of potassium bromate and cellulose, and the criteria for Packing Groups I and II are not met.

A non-Division 5.1 material is a material which, in the 4:1 or 1:1 sample to cellulose ratio (by mass) tested, does not ignite and burn, or exhibits a mean burning time greater than that of a 3:7 mixture, by mass, of potassium bromate and cellulose.

Oxidizer classifications in accordance with National Fire Protection Association are described as follows:

(i) Class 1—An oxidizer that meets the definition of an oxidizer and does not moderately increase the burning rate of combustible materials with which it comes into contact. An example of a class 1 oxidizer is lithium hypochlorite with 39% available chlorine or less. Other examples are sodium percarbonate and sodium dichloro-s-triazinetrione dihydrate.

(ii) Class 2—An oxidizer that will cause a moderate increase in the burning rate of combustible materials with which it comes into contact. An example of a class 2 oxidizer is calcium hypochlorite containing less than 50% free available chlorine.

(iii) Class 3—An oxidizer that will cause a severe increase in the burning rate of combustible materials with which it comes into contact or that will undergo vigorous self-sustained decomposition due to contamination or exposure to heat. An example of a class 3 oxidizer is calcium hypochlorite having greater than 50% free available chlorine.

(iv) Class 4—An oxidizer that can undergo an explosive reaction due to contamination or exposure to thermal or physical shock. In addition, the oxidizer will cause a severe increase in the burning rate of combustible materials with which it comes into contact.

Calcium hypochlorite is a known and commercially available material. Commercial grades of calcium hypochlorite typically contain at least 39, e.g., at least 45 weight percent, available chlorine. More typically, commercial calcium hypochlorite contains at least 50 or 55 weight percent available chlorine, and still more particularly at least 60 weight percent available chlorine, e.g., between 60 or 65 and 80 percent available chlorine. Hence, in a non-limiting embodiment of the present invention, calcium hypochlorite that can be used to prepare the herein described compositions can contain between 39 and 80 weight percent free available chlorine. In alternate non-limiting embodiments, the calcium hypochlorite can contain between 45 and 80, 50 and 80, 65 and 80, 65 and 76, or 70 and 80 weight percent available chlorine. Calcium hypochlorite used to prepare the compositions of the present invention may contain a weight percent available chlorine that ranges between any combination of the described values, including the recited values.

Chemically, the remainder of commercially available calcium hypochlorite is composed of varying amounts of water, and varying minor amounts of inorganic by-product calcium and alkali metal salts incorporated into the calcium hypochlorite product during its manufacturing process. Such salts include, but are not limited to, sodium chloride, calcium chloride, calcium hydroxide, calcium carbonate and calcium chlorate.

Water generally comprises between 5.5 and 16 percent by weight of commercial high strength calcium hypochlorite, although amounts of less than 5.5 weight percent may be present in dry calcium hypochlorite, e.g., 1 to 2 weight percent. In alternate non-limiting embodiments, water comprises 12 percent by weight or less, e.g., 10 percent by weight or less, and often 8.5 percent by weight or less of commercially available calcium hypochlorite that is used to prepare the compositions of the present invention. The amount of water present in hydrated calcium hypochlorite is reported as being between 5.5 and 16 percent, e.g., between 5.5 and 8.5 or 10 percent, by weight of the hydrated calcium hypochlorite material. The amount of water that is present in calcium hypochlorite may vary between any combination of the specified values, inclusive of the recited values. Any commercially available grade of calcium hypochlorite, e.g., such as hydrated calcium hypochlorite materials, can be used to prepare the calcium hypochlorite compositions of the present invention.

The particle size and particle size distribution of the particulate calcium hypochlorite material used to prepare the compositions of the present invention may vary. Although having some influence on the precise properties of the mixture, such as flowability and caking, the particle size and particle size distribution of the particulate calcium hypochlorite may vary from a powdery to a granular material. As a general guideline, commercially available calcium hypochlorite commonly has a principal size distribution between 100 and 6 mesh, as measured by the American Standard Test Method E11 Alternative Sieve Designation (ASTM E11 ASD); namely, the particles vary in size principally between 0.15 millimeters (mm) (0.006 inches) and 3.35 mm (0.13 inches). In a non-limiting embodiment, the particulate calcium hypochlorite will have a principal size distribution between 60 mesh (0.25 mm) and 18 mesh (1.00 mm) based on ASTM E11 ASD. Further, when solid formed articles of the calcium hypochlorite compositions of the present invention are prepared, one skilled in the art will typically select a particle size distribution for the calcium hypochlorite that is amenable to be compressed into the desired solid formed article, e.g., a tablet. An example of commercially available granular calcium hypochlorite that can be used to prepare calcium hypochlorite compositions of the present invention is available from PPG Industries, Inc. under the trademark PITTCLOR®.

Calcium hypochlorite, as described herein, is typically present in the compositions of the present invention in amounts at least sufficient to provide a free available chlorine content that would result in such compositions being classified as a DOT Packing Group II oxidizer (or as a class 2 or 3 NFPA oxidizer) in the absence of the described hydrated magnesium sulfate. In a non-limiting embodiment of the present invention, the calcium hypochlorite is present in the described compositions in amounts sufficient to provide at least 39% by weight free available chlorine (FAC), such as at least 45% by weight FAC, e.g., 50 to 60% by weight FAC, based on the total composition weight. In a further non-limiting embodiment, the calcium hypochlorite is present in the composition in amounts that provide less than approximately 80% or 75% FAC by weight, e.g., less than 65% by weight FAC, based on total composition weight. Compositions prepared in accordance with the present invention may have present therein calcium hypochlorite in an amount sufficient to provide an FAC content ranging between any of those stated values, inclusive of the recited values.

Magnesium sulfate hydrate having an average of between 3 and 5.5, e.g., between 3 and 5, more particularly between 3 and 4, e.g., 3.5, moles of water of hydration per mole of magnesium sulfate is present in the calcium hypochlorite compositions of the present invention in amounts sufficient to result in the mixture having at least a DOT Packing Group III Division 5.1 Classification (or at least a Class 2 NFPA Classification). In alternate non-limiting embodiments of the present invention, the hydrated magnesium sulfate is present in the composition in amounts of from 10 to 45 weight percent, such as from 20 to 35 weight percent, e.g., 25 to 35 weight percent, based on the total weight of the calcium hypochlorite and hydrated magnesium sulfate.

The magnesium sulfate hydrate that is blended with the calcium hypochlorite generally will also be particulate in form, e.g., powdery or granular. The particulate magnesium sulfate hydrate may be of the same general particle size and have the same general particle size distribution as that described for the calcium hypochlorite with which it is mixed, e.g., to facilitate the blending process. In a non-limiting embodiment, the hydrated magnesium sulfate having from 3 to 5.5 moles of water of hydration per mole of magnesium sulfate may be prepared by blending appropriate amounts of (i) magnesium sulfate having not more than 3 moles of water of hydration per mole of magnesium sulfate, and (ii) hydrated magnesium sulfate having greater than 3 moles of water of hydration per mole of magnesium sulfate and maintaining the blend for a time sufficient to expend the exotherm resulting form the blending operation.

In alternate non-limiting embodiments, hydrated magnesium sulfate having an average water content of from 31 to 45%, i.e., 3 to 5.5 waters of hydration, or an average water content of from 31 to 43%, i.e., 3 to 5 waters of hydration, may be prepared by blending anhydrous magnesium sulfate and a hydrated magnesium sulfate having a hydrate level greater than 3, such as greater than 4, e.g., magnesium sulfate heptahydrate, in the appropriate molar ratios and then allowing the water of hydration in the blend of anhydrous and hydrated magnesium sulfate to equilibrate. Equilibration of the hydrated water in the blend may be achieved by ageing the blend at ambient temperature for a sufficient length of time, e.g., for several days such as up to 3 days, or by warming the blend to accelerate the equilibration process, e.g., by heating the blend in a substantially sealed container to temperatures of from 50° C. to 100° C., e.g., from 50° C. to 75° C., for from 4 to 20 hours or until equilibrium has been achieved. By monitoring the temperature of the mixture (blend), the progress of equilibration, e.g., the redistribution of the water of hydration, can be observed because the redistribution process is exothermic. Equilibration is substantially completed when the temperature of the mixture, e.g., at the core of the mixture, has reached a maximum and then gradually cools back to substantially ambient temperature as the rate of heat production gradually declines to a negligible level.

The blending process may be performed in any suitable dry blending vessel, e.g., a vessel that is resistant to chemical attack from anhydrous magnesium sulfate and magnesium sulfate hydrates at ambient temperatures. To avoid uptake of water from the atmosphere or loss of water to the atmosphere by the magnesium sulfate mixture, the vessel in which the equilibration process is performed desirably is substantially closed to the atmosphere during the equilibration process and substantially filled with the mixture of magnesium sulfates so that the volume ratio of free air to solid mixture in the vessel is not excessive.

Once the partial hydrate of magnesium sulfate has been prepared, it may be combined with calcium hypochlorite by tumble mixing, passage through a screw conveyer, or by other suitable dry blending methods known to those skilled in the art. To avoid absorption of water from the atmosphere (humidity) by the calcium hypochlorite and the partial hydrate of magnesium sulfate, the blending should be performed under substantially dry conditions, e.g., conditions that substantially exclude atmospheric water. In a non-limiting embodiment, closed blending vessels or nitrogen gas pads can be used to exclude atmospheric water. Such precautions may not be required when low humidity conditions are present and there is little opportunity for the components to absorb substantial amounts of water from the atmosphere.

In a non-limiting embodiment, magnesium sulfate hydrate containing n moles of water of hydration, wherein n is a number of from 1 to 6, e.g., 3 to 5, may be prepared by mixing n moles of magnesium sulfate heptahydrate with 7−n moles of anhydrous magnesium sulfate, and thereafter allowing the water of hydration in the mixture to equilibrate between the magnesium sulfate heptahydrate and the anhydrous magnesium sulfate. Of course the redistribution of moisture may be conducted on any scale, so that in a general case m×n moles of magnesium sulfate heptahydrate are mixed with m×(7−n) moles of anhydrous magnesium sulfate, where m may be any positive real number greater than zero. In a broader sense, other hydrates may be used in place of the seven hydrate or in place of the anhydrous magnesium sulfate by adjusting appropriately the stoichiometric ratios of the magnesium sulfate materials used. The primary considerations with regard to the scale of the process is that the reactants desirably fit in and largely fill the container that is used; and that heat-up times (if heat is used) will vary with the scale due to the time required for heat to penetrate the mixture from the heat source, e.g., an oven. Since large heat gradients may develop in a large mass of a magnesium sulfate mixture, such a condition may result in the uneven distribution of moisture within the mixture because the moisture will tend to gravitate to the cooler portions of the mixing vessel. Therefore, if large static mixing vessels are used, extra equilibration time may be required after the heat gradients have subsided. In the case of large mixtures, continuous mixing of the mixture is desirable, as for example by the use of a jacketed double cone blender. Alternatively, partial hydrates of magnesium sulfate may be prepared by controlled drying of magnesium sulfate heptahydrate or by careful partial hydration of anhydrous magnesium sulfate powder. In either of these later cases, it is desirable to compact the partial hydrate of magnesium sulfate (once formed) into granules to enhance its flowability, use and compatibility with granular calcium hypochlorite.

Alternatively, magnesium sulfate trihydrate can be selectively crystallized by a process that, for example, includes heating an aqueous dilute magnesium sulfate solution in a vessel to temperatures within the range of from 106° C. to 111° C. Magnesium sulfate trihydrate is reported to precipitate from this solution at those temperatures. The dilute magnesium sulfate solution generally contains from 5 to 40 weight percent of magnesium sulfate. Further, the precipitation may be facilitated by adding seed crystals of the trihydrate to the heated solution. This process is more fully described in U.S. Pat. No. 3,297,413 at column 1, line 43 to column 2, line 55.

The calcium hypochlorite compositions of the present invention may also contain additives, e.g., adjuvants, that do not cause the composition to be classified as a Division 5.1 oxidizer or that deleteriously affect the sanitizing effectiveness of the composition. In one embodiment, for example, when compositions of the present invention are formed into solid shaped articles, e.g., tablets, adjuvant additives that may be present include, but are not limited to, conventional dissolution rate modifiers, binders and buffering agents. Other additives that may be present when the compositions are in either tablet or granular form include, but are not limited to, chemically compatible scale inhibitors, colorant-containing inorganic salts, such as those described in U.S. Pat. No. 5,049,385, at column 5, line 62 through column 7, line 8, and polyfluorinated polymers, such as those described in U.S. Pat. No. 4,970,020 at column 4, line 4 through column 6, line 8, which disclosures are incorporated herein by reference.

Inert inorganic diluent additives may also be added to the calcium hypochlorite compositions of the present invention. Non-limiting examples of inert, inorganic solid diluent materials include sodium chloride, potassium chloride, lithium chloride, calcium chloride, calcium oxide, calcium hydroxide, magnesium hydroxide, aluminum hydroxide, sodium sulfate and mixtures of such inorganic inert materials. In one non-limiting embodiment, pH neutral salts are used. By inert is meant that the inorganic material does not affect substantially the shelf life of the calcium hypochlorite, or the SADT (self accelerating decomposition temperature) of the calcium hypochlorite. Desirably, the inert inorganic diluent additive is anhydrous; however, it may contain water of hydration if such hydrated water does not deleteriously affect the magnesium sulfate hydrate that is used to prepare the compositions of the present invention.

The amount of adjuvant additives, including the added inert, inorganic diluent materials, present within the solid calcium hypochlorite-magnesium sulfate hydrate compositions of the present invention may vary. Generally, such additives may be present in amounts, for example, ranging from 0.001% to 15% by weight, alternatively from 0.01% to 12 percent by weight, e.g., from 0.1 to 5% by weight, based on the total weight of the composition. The amount that each of such additives that may be added to the calcium hypochlorite-magnesium sulfate hydrate compositions of the present invention can vary between any of the aforestated values, inclusive of the recited values. For example, non-limiting examples of such additives and their amounts include, but are not limited to, sodium tripolyphosphate, which in one non-limiting embodiment may be present in amounts of from 1 to 5, e.g., 3 weight percent; and added inert salts, e.g., sodium chloride, which in one non-limiting embodiment can be present in amounts of from 8 to 15, e.g., 10 to 12, weight percent.

The calcium hypochlorite-magnesium sulfate hydrate compositions of the present invention, usually in the form of granules, pellets or tablets, may be added directly to an aqueous medium to be treated, e.g., sanitized, or may be added to any suitable chlorination unit or device, which is used to prepare an aqueous solution of calcium hypochlorite, which solution in turn is used to sanitize an aqueous body of water, e.g., a swimming pool, hot tub or spa. Non-limiting examples of suitable chlorination units are those described in FIG. 1 of U.S. Pat. No. 5,384,102, FIG. 1 of U.S. Pat. No. 5,427,748 and FIG. 1 of U.S. Pat. No. 6,298,871 B1, which Figures and the supporting disclosures of the structures of the chlorination units are incorporated herein by reference.

The calcium hypochlorite-magnesium sulfate hydrate compositions of the present invention are useful for the treatment of standing and recirculating water systems, such as cooling towers, evaporative condensers, air washers, swimming pools, hot tubs, spas, etc, and for the preparation of aqueous calcium hypochlorite solutions useful for sanitizing surfaces. When used to sanitize the surface of an article, the sanitized water can be applied to such a surface by any appropriate method, examples of which include but are not limited to, spray application; wiping with soaked rags; curtain or waterfall application; and soaking by immersion.

Compositions of the present invention can be formed into solid shaped articles, including but not limited to, tablets, bricks, briquettes, pellets, etc, by conventional size enlargement equipment. Examples of such equipment include, but are not limited to, molding presses, tableting presses, roll-type presses, pellet mills and screw extruders. In one contemplated embodiment, the solid shaped article can have a mass of between 1 gram and 350 grams or more, e.g., between 7 and 300 grams. The size of the solid shaped article may vary widely and is determined typically by the intended application, such as the internal dimensions and operating parameters of a chlorination unit in which the solid shaped article is to be used, and/or conventional commercial handling and packaging units. In the case of a solid shaped article that is formed in the shape of a tablet having a mass of, for example, from 300 to 350 grams, the diameter of the tablet in one non-limiting embodiment can be between 7.6 centimeters (cm) (3 inches) and 8.9 cm (3.5 inches), e.g., between 7.9 cm (3.125 inches) and 8.3 cm (3.25 inches), and have a thickness of from 2.5 cm (1 inch) to 5.1 cm (2 inches), e.g., 3.2 cm (1.25 inches). The dimensions of the tablet can vary between any combination of the aforestated values, inclusive of the recited values.

In a non-limiting embodiment, granular calcium hypochlorite having a size distribution predominantly between 45 mesh and 10 mesh ASTM E11 ASD, e.g., the granules are principally between on average 0.36 mm (0.014 inches) and 2.00 mm (0.08 inches) is used to produce solid shaped articles such as tablets. Particles smaller than 50 mesh ASTM E11 ASD, e.g., 0.30 mm (0.012 inches), that are present in the granular calcium hypochlorite generally represent a minor percentage, usually less than 2 percent, of the material charged to a size enlargement device.

The present invention is more particularly described in the examples that follow, which are intended to be illustrative only, since numerous modifications and variations therein will be apparent to those skilled in the art.

In the following examples, unless otherwise specified, all parts and percentages are by weight. Magnesium sulfate heptahydrate, USP grade, was used. Such material can be obtained from Giles Chemical, Waynesville, N.C. Anhydrous magnesium sulfate, a certified anhydrous powder obtained from Fischer Scientific was used. SADT temperatures for the compositions tested in the examples were obtained using the procedure outlined in sections 28.4.4 et seq. (Heat accumulation storage test) of the UN Manual of Tests and Criteria (Transport of Dangerous Goods), 3rd revised edition (1999), which is referred to hereinafter as the SADT H.4 Test. As stated in section 24.4.4.1 of that manual, the SADT (self accelerating decomposition temperature) is reported as the lowest temperature at which the sample exceeds the test chamber temperature by 6° C. or more within 7 days of the time that the heated sample has reached a temperature within 2° C. of the test chamber temperature. (See also, sections 24.4.3.1 and 24.4.3.2 of the manual.)

EXAMPLE 1 (COMPARATIVE)

Sample A

A sample of Super Shock-It® fine granular calcium hypochlorite (South Central Pool Supply) with a nominal 68 weight percent assay and a water content in the range of approximately 6 to 6.5 weight percent was tested using the SADT H.4 test. A Dewar bottle with a heat loss of approximately 15 mW/kg-° K. was 80% filled with the sample. This test approximates an SADT H.4 test of a drum containing approximately 190 kg of the calcium hypochlorite. The test chamber temperature was 50.4° C. The sample exceeded the 6° C. limit at 5.2 days and later reached a maximum temperature of 58.1° C. before beginning to cool. The SADT temperature was recorded as 50° C.

Sample B

A sample of a mixture of 88.2 weight percent of the same grade and lot of fine granular calcium hypochlorite as was used for Sample A, and 11.8 weight percent of magnesium sulfate heptahydrate was tested using the SADT H.4 test. This sample mixture contained a net 60% available chlorine and approximately 11 weight percent water. The test chamber temperature was 50.4° C. The sample exceeded the 6° C. limit at 6.5 days and later reached a maximum temperature of 83° C. The SADT temperature was recorded as ≦50° C.

The data of this example shows that a mixture of granular calcium hypochlorite (nominal 68% assay) with 11.8 weight percent of magnesium sulfate heptahydrate produced higher temperatures during storage at 50.4° C. than the same grade of calcium hypochlorite alone.

EXAMPLE 2

Five samples of a mixture of 82 weight percent of Leslies Power Powder® Plus™ granular calcium hypochlorite (Leslies Swimming Pool Supplies, Phoenix, Ariz.) and 18 weight percent of a blend of equilibrated magnesium sulfate heptahydrate and anhydrous magnesium sulfate in a 2:1 weight ratio were tested using the SADT H.4 test. The test chamber temperature for the SADT test was 50.4° C. The 2:1 weight ratio of magnesium sulfate heptahydrate/anhydrous magnesium sulfate is calculated to provide magnesium sulfate 3.5 hydrate after equilibration. The granular calcium hypochlorite had a nominal assay of 73 weight percent calcium hypochlorite and a water content of approximately 6 weight percent. Overall, the samples contained a net 60% available chlorine and approximately 11 weight percent moisture.

The blends of 2:1 magnesium sulfate heptahydrate/anhydrous magnesium sulfate used in the five samples varied in how the blends were treated or not treated. The blends had the following treatments or non-treatments:

Blend A—A fresh (untreated) blend of 12 wt. % magnesium sulfate heptahydrate and 6 wt. % anhydrous magnesium sulfate.

Blend B—A blend (total mass of 486 grams) of 67 wt. % magnesium sulfate heptahydrate and 33 wt. % anhydrous magnesium sulfate that was placed in a Dewar flask, which was placed in a 50° C. oven for 21 hours. FIG. 1 shows the temperature at the core of the mass of the blend during the period the flask was in the oven. FIG. 1 shows that center of the mass became considerably hotter than the ambient oven environment, reaching a peak temperature of approximately 13° C. above ambient at approximately 8 hours into the heat treatment. The temperature of the mass declined gradually, approaching ambient oven temperature after an elapsed time of approximately 18 hours.

The resulting heated blend (additive) was then uniformly mixed with Leslies Power Powders® Plus™ granular calcium hypochlorite in a ratio of 18% additive to 82% calcium hypochlorite. This resulted in a sample mixture containing a net 60% available chlorine and approximately 11 weight percent water.

Figure 2:
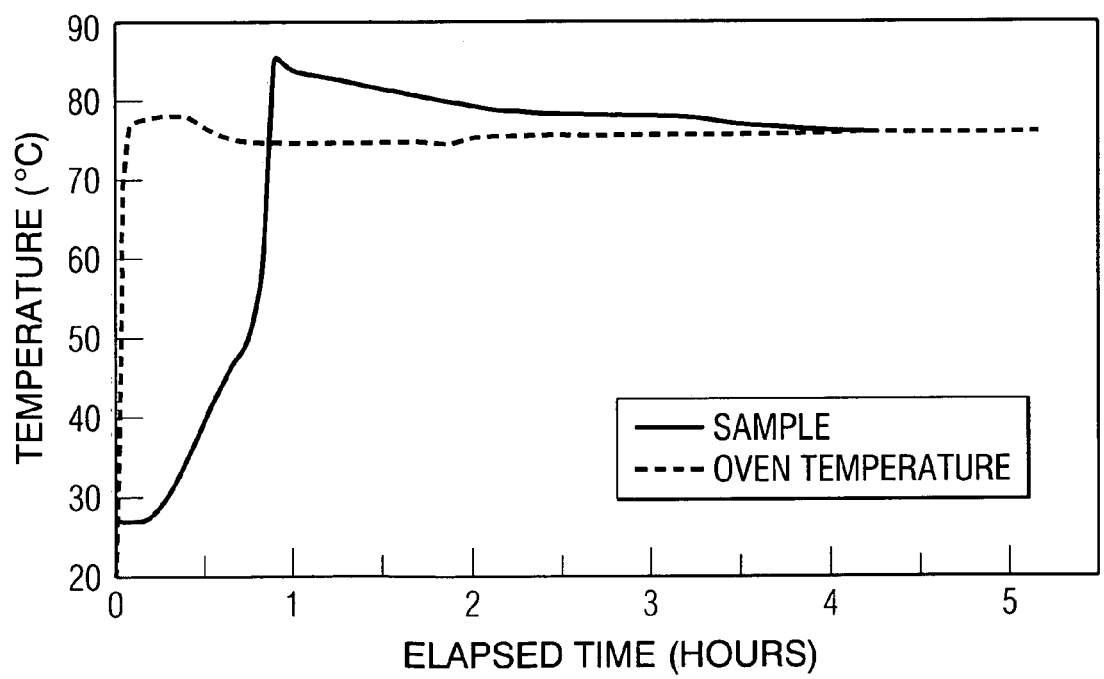
FIG. 2 is a plot of the core temperature versus time of a 2:1 blend (by weight) of magnesium sulfate heptahydrate:anhydrous magnesium sulfate in an oven that is heated to 75° C.

Blend C—A blend (total mass of 360 grams) of 67 wt. % magnesium sulfate heptahydrate and 33 wt. % anhydrous magnesium sulfate was placed in an 82 mm wide mouth polypropylene jar and the jar placed in a 75° C. oven for approximately 4.5 hours. FIG. 2 shows the temperature at the core of the mass of the blend during the heating period. FIG. 2 shows that the core became hotter than the ambient oven temperature, reaching a peak temperature of approximately 10° C. above ambient at approximately 1 hour into the heating cycle. Then the temperature gradually declined, approaching ambient oven temperature after an elapsed time of approximately 4 hours.

The resulting heated blend (additive) was then uniformly mixed with Leslies Power Powders® Plus™ granular calcium hypochlorite in a ratio of 18% additive to 82% calcium hypochlorite. This resulted in a sample mixture containing a net 60% available chlorine and approximately 11 weight percent water.

Blend D—A blend of 67 wt. % magnesium sulfate heptahydrate and 33 wt. % anhydrous magnesium sulfate that was heated for more than 12 hours at 100° C. The resulting heated blend (additive) was then uniformly mixed with the Leslies Power Powders® Plus™ granular calcium hypochlorite in a ratio of 18% additive to 82% calcium hypochlorite. This resulted in a sample mixture containing 60% available chlorine and approximately 11 weight percent water.

Blend E—A blend of 67 wt. % magnesium sulfate heptahydrate and 33 wt. % anhydrous magnesium sulfate was aged for approximately 54 hours at room temperature. The resulting aged blend (additive) was then uniformly mixed with the Leslies Power Powders® Plus™ granular calcium hypochlorite in a ratio of 18% additive to 82% calcium hypochlorite. This resulted in a sample mixture containing 60% available chlorine and approximately 11 weight percent water.

SADT test results for the five sample mixtures were as follows:

Sample A exceeded the 6° C. limit at 6.9 days and reached a maximum temperature of 67° C. The SADT temperature was recorded as ≦50° C.

Sample B did not exceed the 6° C. limit, reaching a maximum 5.9° C. above ambient in 6.8 days. The SADT temperature was recorded as ≧55° C.

Sample C did not exceed the 6° C. limit, reaching a maximum of approximately 4.5° C. above ambient in 6.6 days. The SADT temperature was recorded as ≧55° C.

Sample D did not exceed the 6° C. limit above ambient within 7 days, but did exceed the limit after 7.2 days— reaching a maximum temperature of 66° C. The SADT temperature was recorded as 55° C.

Sample E did not exceed the 6° C. limit until after 7 days, reaching a maximum of 59° C. in 7.3 days. The SADT temperature was recorded as 55° C.

The results of this Example 2 show that pre-blending and aging/heating blends of magnesium sulfate heptahydrate and anhydrous magnesium sulfate to allow the water of hydration of the heptahydrate to equilibrate to form a nominal magnesium sulfate 3.5 hydrate, and mixing these blends with granular hydrated calcium hypochlorite produce a calcium hypochlorite composition that has improved thermal stability, as reflected in the higher SADT temperatures and/or lower maximum temperatures being reached than for a composition containing the same amount of available chlorine and the same total moisture content but made with magnesium sulfate heptahydrate as the sole additive. In two cases, the maximum temperature reached was lower and the SADT temperature higher for a mixture containing magnesium sulfate 3.5 hydrate than for unblended calcium hypochlorite. See Samples B and C where the SADT temperature was ≧55° C. and the maximum temperature reached was <57° C.

EXAMPLE 3

Magnesium sulfate heptahydrate (MSH) was blended with anhydrous magnesium sulfate (AMS) in various ratios to obtain blends of magnesium sulfate having nominal hydrate levels ranging from 3 to 6. Each of the blends was heated at 75° C. for 3 hours to allow the water in the blend to migrate to the most stable sites and produce the nominal magnesium sulfate n-hydrate. Each of the blends was mixed with Leslies Power Powder® Plus™ granular calcium hypochlorite (nominal assay of 73 wt. %) in a weight ratio of 25 weight percent of the blend and 75 weight percent of the granular calcium hypochlorite. The blends of magnesium sulfate heptahydrate and anhydrous magnesium sulfate that were prepared are tabulated in Table 1.

TABLE 1

| Sample Number | Nominal Product[a] | Wt. % in Blend MSH | Wt. % in Blend AMS | Wt. % $H_2O$[b] in Blend |
|---|---|---|---|---|
| 1 | $MgSO_4 3H_2O$ | 60.56 | 39.44 | 31.0 |
| 2 | $MgSO_4 4H_2O$ | 73.19 | 26.81 | 37.4 |
| 3 | $MgSO_4 5H_2O$ | 83.66 | 16.34 | 42.8 |
| 4 | $MgSO_4 6H_2O$ | 92.47 | 7.53 | 47.3 |

[a]Nominal magnesium sulfate hydrate product.
[b]% Water in nominal product additive blend of MSH and AMS.

The sample mixtures of granular hydrated calcium hypochlorite and nominal magnesium sulfate hydrate product were tested using the SADT H.4 test. The ambient test temperature was 50.4° C. Results are tabulated in Table 2 and compared to the SADT results for Leslies Power Powder® Plus™ granular calcium hypochlorite (nominal assay of 73 wt. %, noted in Table 2 as CH-73) alone.

TABLE 2

| Sample/ Blend No. | SADT Temp. °C. (400 lb Drum)[a] | Maximum Temp. °C. | Days To Exceed 6° C. Limit |
|---|---|---|---|
| CH-73 | 50 | 57.4 | 3.1 |
| 1 | ≧55 | 55.8 | [b] |
| 2 | 50 | 56.9/57.4[c] | 4.2/4.7[c] |

TABLE 2-continued

| Sample/ Blend No. | SADT Temp. °C. (400 lb Drum)[a] | Maximum Temp. °C. | Days To Exceed 6° C. Limit |
|---|---|---|---|
| 3 | 50 | 58.9/60.6[c] | 4.6/4.8[c] |
| 4 | 50 | 62.7 | 5.1 |

[a]Estimated by simulation with UN H.4 test using Dewar bottle with heat loss of approximately 15 mW/kg-° K.
[b]The maximum temperature, just below the 6° limit, was reached in 4.9 days.
[c] Replicate samples.

The results of Table 2 demonstrate that the lower hydrates of magnesium sulfate are more compatible with granular hydrated calcium hypochlorite than are the higher hydrates of magnesium sulfate, resulting in less self-heating and a possible increase in the SADT, depending on specific package size. Since SADT is package size dependent and is by convention only measured to within 5° C., the hydration level at which a 5° C. SADT step occurs will depend on package size. However, regardless of package size, the data shows that the lower hydrates of magnesium sulfate are more compatible with calcium hypochlorite, and as a general rule cause less self-heating and lower maximum temperatures during SADT testing.

EXAMPLE 4

Formulations of 82 weight percent Leslies Power Powder® Plus™ granular calcium hypochlorite (nominal assay of 73 wt. %) with 18 weight percent of the 3, 4, and 5 hydrates of magnesium sulfate (as were tested using the SADT H.4 test in Example 3) were subjected to burn tests according to procedure UN 0.1, (Test for Oxidizing Solids) found in section 34.4 (and subsections therein) in "Recommendations on the Transport of Dangerous Goods: Manual of Tests and Criteria", 3$^{rd}$ revised edition, New York and Geneva, United Nations, 1999, pp. 337-341). In the burn test, the oxidizer is blended with cellulose of a fixed dryness (to serve as fuel for the burn) and the mixture is ignited by passage of current through a Nichrome® wire (registered to Driver-Harris Wire Company) placed under a pile of the mixture. For the present tests, all of the burns were done with an oxidizer to cellulose weight ratio of 4:1, as this gives hotter, faster burns than a 1:1 ratio. For comparison, a formulation of the same granular calcium hypochlorite with magnesium sulfate heptahydrate was used. All blends contained 60% available chlorine. Results are tabulated in Table 3.

TABLE 3

| Nominal $MgSO_4$ Hydrate Used | Water in Final Blend Weight Percent | Average Burn Time, Seconds |
|---|---|---|
| 3 | 10.5 | 39 |
| 4 | 11.6 | 46 |
| 5 | 12.6 | 46 |
| 7 | 14.1 | 43 |

As shown in Table 3, the average burn times were substantially the same whether the additive was the 3, 4, 5 or 7 hydrate of magnesium sulfate. The extra water content in magnesium sulfate heptahydrate appears to be relatively ineffectual as an exotherm control agent or fire quencher.

In a similar test, mixtures were prepared containing 47% available chlorine and 36% of a magnesium sulfate hydrate. In all cases, the mixtures contained 64% Leslies Power Powder® Plus™ granular calcium hypochlorite (nominal assay of 73 wt. %) and the magnesium sulfate hydrate additive was formed by baking the appropriate ratio of anhydrous magnesium sulfate with magnesium sulfate heptahydrate at 75° C. for 3 hours. All of the formulations were observed to give slow, flameless smoldering burns, making the times variable and impossible to measure with great accuracy. In this case, burn time depended to a small degree on whether the 3, 4, 5, or 7 hydrate was used; however, in all cases the burn times were long enough for the blend to qualify as a non-UN/DOT Division 5.1 oxidizer. With such slow, flameless burns, precise measurement of burn time is less accurate and the difference in burn times between the various mixtures is relatively insignificant. Results are tabulated in Table 4.

TABLE 4

| Nominal MgSO$_4$ Hydrate Used | Water in Formulation Weight Percent[a] | Average Burn Time Seconds* |
| --- | --- | --- |
| 3 | 15 | 143 |
| 4 | 17.3 | 165 |
| 5 | 19.2 | 180 |
| 7 | 22.2 | 193 |

*Averages of five successive burns.
[a]Weight percent water in mixture of calcium hypochlorite and magnesium sulfate hydrate.

Although the present invention has been described with reference to specific details of certain embodiments thereof, it is not intended that such details should be regarded as limitations upon the scope of the invention except insofar as they are included in the accompanying claims.

What is claimed is:

1. A composition comprising a mixture of (a) calcium hypochlorite and (b) hydrated magnesium sulfate having an average of from 3 to 5.5 moles of water of hydration per mole of magnesium sulfate, the amount of said hydrated magnesium sulfate present in said composition being such that the composition has at least a DOT Packing Group III Division 5.1 Classification.

2. The composition of claim 1 wherein the free available chlorine content of the calcium hypochlorite is at least 39 percent.

3. The composition of claim 2 wherein the calcium hypochlorite is hydrated calcium hypochlorite having a free available chlorine content of from 45 to 80 percent, and the hydrated magnesium sulfate has an average of from 3 to 5 moles of water of hydration per mole of magnesium sulfate.

4. The composition of claim 3 wherein the hydrated magnesium sulfate is present in the composition in amounts of from 10 to 45 weight percent.

5. The composition of claim 4 wherein the amount of magnesium sulfate hydrate is present in the composition in amounts such that the composition is classified as a non Division 5.1 oxidizer.

6. The composition of claim 5 wherein the free available chlorine content of the hydrated calcium hypochlorite is from 55 to 75 percent, the hydrated magnesium sulfate has an average of from 3 to 4 moles of water of hydration per mole of magnesium sulfate, and the hydrated magnesium sulfate is present in the composition in amounts of from 20 to 35 weight percent.

7. The composition of claim 4 wherein the composition is in a form chosen from granular, tablets, briquettes and pellets.

8. A calcium hypochlorite composition that is classified as at least a DOT Packing Group III Division 5.1 oxidizer, said composition comprising a mixture of (a) calcium hypochlorite and (b) hydrated magnesium sulfate having from 3 to 5.5 moles of water of hydration per mole of magnesium sulfate, said hydrated magnesium sulfate having been prepared by blending appropriate molar amounts of (i) magnesium sulfate having not more than 3 moles of water of hydration per mole of magnesium sulfate and (ii) hydrated magnesium sulfate having greater than 3 moles of water of hydration per mole of magnesium sulfate for a time sufficient to expend the exotherm resulting from the blend.

9. The composition of claim 8 wherein the free available chlorine content of the calcium hypochlorite is at least 39 percent, the magnesium sulfate (i) having not more than 3 moles of water of hydration per mole of magnesium sulfate is anhydrous magnesium sulfate, and the hydrated magnesium sulfate (ii) has from 4 to 7 moles of water of hydration per mole of magnesium sulfate.

10. The composition of claim 9 wherein the calcium hypochlorite is hydrated calcium hypochlorite having a free available chlorine content of from 45 to 80 percent, and the hydrated magnesium sulfate has an average of from 3 to 5 moles of water of hydration per mole of magnesium sulfate.

11. The composition of claim 10 wherein the hydrated magnesium sulfate is present in the composition in amounts of from 10 to 45 weight percent.

12. The composition of claim 10 wherein the amount of magnesium sulfate hydrate is present in the composition in amounts such that the composition is classified as a non Division 5.1 oxidizer.

13. The composition of claim 12 wherein the free available chlorine content of the hydrated calcium hypochlorite is from 55 to 75 percent, the hydrated magnesium sulfate has an average of from 3 to 4 moles of water of hydration per mole of magnesium sulfate, and the hydrated magnesium sulfate is present in the composition in amounts of from 20 to 35 weight percent.

14. The composition of claim 11 wherein the hydrated magnesium sulfate is prepared by heating the appropriate amounts of magnesium sulfate (i) and hydrated magnesium sulfate (ii) at temperatures of from 50° C. to 100° C. for from 4 to 20 hours.

15. The composition of claim 14 wherein the hydrated magnesium sulfate is prepared by heating the appropriate amounts of magnesium sulfate (i) and hydrated magnesium sulfate (ii) at temperatures of from 50° C. to 75° C. for from 4 to 15 hours.

16. The composition of claim 14 wherein the composition is in a form chosen from granular, tablets, briquettes and pellets.

* * * * *